United States Patent
Chung et al.

(10) Patent No.: US 9,989,199 B2
(45) Date of Patent: Jun. 5, 2018

(54) ILLUMINATION DEVICE AND LIGHT-EMITTING MODULE THEREOF

(71) Applicant: PARAGON SEMICONDUCTOR LIGHTING TECHNOLOGY CO., LTD., New Taipei (TW)

(72) Inventors: Chia-Tin Chung, Miaoli County (TW); Shih-Neng Tai, Taoyuan County (TW); Pei-Chun Liu, New Taipei (TW)

(73) Assignee: PARAGON SEMICONDUCTOR LIGHTING TECHNOLOGY CO., LTD., New Taipei (TW)

( * ) Notice: Subject to any disclaimer, the term of this patent is extended or adjusted under 35 U.S.C. 154(b) by 72 days.

(21) Appl. No.: 15/228,709

(22) Filed: Aug. 4, 2016

(65) Prior Publication Data
US 2017/0321848 A1    Nov. 9, 2017

(30) Foreign Application Priority Data
May 3, 2016 (TW) .............................. 105206302 U

(51) Int. Cl.
| H01R 33/00 | (2006.01) |
| F21K 9/238 | (2016.01) |
| H05B 33/08 | (2006.01) |
| F21K 9/68 | (2016.01) |
| F21V 19/00 | (2006.01) |
| F21Y 115/10 | (2016.01) |

(52) U.S. Cl.
CPC ............... *F21K 9/238* (2016.08); *F21K 9/68* (2016.08); *F21V 19/0055* (2013.01); *H05B 33/083* (2013.01); *H05B 33/0845* (2013.01); *F21Y 2115/10* (2016.08)

(58) Field of Classification Search
CPC .... F21K 9/238; F21V 19/003–19/0055; F21L 4/00–4/085
See application file for complete search history.

(56) References Cited

U.S. PATENT DOCUMENTS

2013/0163261 A1* 6/2013 Shimoji ................ H01R 31/06
362/382

* cited by examiner

*Primary Examiner* — Sean Gramling
(74) *Attorney, Agent, or Firm* — Li & Cai Intellectual Property (USA) Office

(57) ABSTRACT

The instant disclosure provides an illumination device and a light-emitting module thereof. The light-emitting module includes a cover structure, a light-emitting structure and an assembled type capacitor assembly. The cover structure has a through opening. The light-emitting structure includes a circuit substrate disposed under the cover structure and a plurality of light-emitting elements disposed on the circuit substrate and exposed from the through opening. The assembled type capacitor assembly includes at least one assembled type capacitor electrically connected the circuit substrate through an assembled type electrical connection assembly, and the at least one assembled type capacitor is separated from the circuit substrate.

12 Claims, 12 Drawing Sheets

ILLUMINATION DEVICE AND LIGHT-EMITTING MODULE THEREOF

BACKGROUND OF THE INVENTION

1. Field of the Invention

The instant disclosure relates to an illumination device and a light-emitting module thereof, and more particularly to an illumination device with at least assembled type capacitor and a light-emitting module thereof.

2. Description of Related Art

The invention of the lamp greatly changed the style of building construction and the living style of human beings, allowing people to work during the night. Traditional lighting devices such as lamps that adopt incandescent bulbs, fluorescent bulbs, or power-saving bulbs have been generally well-developed and used intensively indoor illumination. However, compared to the newly developed light-emitting-diode (LED) lamps, these traditional lamps have the disadvantages of quick attenuation, high power consumption, high heat generation, short working life, high fragility, and being not recyclable. Thus, various LED package structures are created to replace the traditional lighting devices.

SUMMARY OF THE INVENTION

One aspect of the instant disclosure relates to an illumination device and a light-emitting module thereof.

One of the embodiments of the instant disclosure provides a light-emitting module comprising a cover structure, a light-emitting structure and an assembled type capacitor assembly. The cover structure has a through opening. The light-emitting structure includes a circuit substrate disposed under the cover structure and a plurality of light-emitting elements disposed on the circuit substrate and exposed from the through opening. The assembled type capacitor assembly includes at least one assembled type capacitor electrically connected the circuit substrate through an assembled type electrical connection assembly, and the at least one assembled type capacitor is separated from the circuit substrate.

More particularly, the at least one assembled type capacitor is disposed inside the cover structure, each the light-emitting element is in parallel connection with the at least one assembled type capacitor, and the light-emitting structure includes at least one resistor disposed on the circuit substrate and in parallel connection with the at least one assembled type capacitor.

More particularly, the at least one assembled type capacitor is disposed outside the cover structure, each the light-emitting element is in parallel connection with the at least one assembled type capacitor, and the light-emitting structure includes at least one resistor disposed on the circuit substrate and in parallel connection with the at least one assembled type capacitor.

Another one of the embodiments of the instant disclosure provides a light-emitting module, comprising a cover structure, a light-emitting structure, an assembled type capacitor assembly and an assembled type electrical connection assembly. The cover structure includes a cover body and a plurality of positioning elements for positioning the cover body. The cover body has a plurality of first receiving spaces formed on a bottom side thereof, at least one second receiving space formed on the bottom side thereof, and a plurality of positioning portions disposed inside the at least one second receiving space, and the cover body has a through opening and a surrounding light-reflecting surface formed on an inner wall of the through opening. The light-emitting structure is disposed inside the at least one second receiving space. The light-emitting structure includes a circuit substrate positioned on the bottom side of the cover body through the positioning portions, a plurality of light-emitting elements disposed on the circuit substrate and electrically connected to the circuit substrate, a surrounding light-reflecting frame disposed on the circuit substrate to surround the light-emitting elements, and a package body disposed on the circuit substrate to cover the light-emitting elements, and the light-emitting elements, the surrounding light-reflecting frame and the package body are exposed from the through opening. The assembled type capacitor assembly includes a plurality of assembled type capacitors respectively disposed inside the first receiving spaces of the cover body, and each assembled type capacitor is separated from the circuit substrate. The assembled type electrical connection assembly is disposed between the light-emitting structure and the assembled type capacitor assembly. The assembled type electrical connection assembly includes at least one positive electrical connection and at least one negative electrical connection. Each assembled type capacitor is electrically connected to the circuit substrate and the light-emitting elements of the light-emitting structure through the at least one positive electrical connection and the at least one negative electrical connection.

Yet another one of the embodiments of the instant disclosure provides an illumination device, comprising a lamp structure and a light-emitting module. The light-emitting module is disposed on the lamp structure, and the light-emitting module includes a cover structure, a light-emitting structure, an assembled type capacitor assembly and an assembled type electrical connection assembly. The cover structure includes a cover body and a plurality of positioning elements for positioning the cover body on the lamp structure. The cover body has a plurality of first receiving spaces formed on a bottom side thereof, at least one second receiving space formed on the bottom side thereof, and a plurality of positioning portions disposed inside the at least one second receiving space, and the cover body has a through opening and a surrounding light-reflecting surface formed on an inner wall of the through opening. The light-emitting structure is disposed inside the at least one second receiving space. The light-emitting structure includes a circuit substrate positioned on the bottom side of the cover body through the positioning portions, a plurality of light-emitting elements disposed on the circuit substrate and electrically connected to the circuit substrate, a surrounding light-reflecting frame disposed on the circuit substrate to surround the light-emitting elements, and a package body disposed on the circuit substrate to cover the light-emitting elements, and the light-emitting elements, the surrounding light-reflecting frame and the package body are exposed from the through opening. The assembled type capacitor assembly includes a plurality of assembled type capacitors respectively disposed inside the first receiving spaces of the cover body, and each assembled type capacitor is separated from the circuit substrate. The assembled type electrical connection assembly is disposed between the light-emitting structure and the assembled type capacitor assembly. The assembled type electrical connection assembly includes at least one positive electrical connection and at least one negative electrical connection, and each assembled type capacitor is electrically connected to the circuit substrate and the light-emitting elements of the light-emitting structure through the at least one positive electrical connection and the at least one negative electrical connection.

More particularly, the cover body has at least one first connection passage for receiving the at least one positive electrical connection and at least one second passage for receiving the at least one negative electrical connection, the circuit substrate has at least one positive conductive pad and at least one negative conductive pad, and each assembled type capacitor has a positive electrode and a negative electrode. The at least one first connection passage is communicated between the first receiving spaces and the at least one second receiving space, and the positive electrode of each assembled type capacitor is electrically connected to the at least one positive conductive pad of the circuit substrate through at least one positive electrical connection. The at least one second connection passage is communicated between the first receiving spaces and the at least one second receiving space, and the negative electrode of each assembled type capacitor is electrically connected to the at least one negative conductive pad of the circuit substrate through at least one negative electrical connection. The surrounding light-reflecting frame is extended from a coating initial point to a coating terminal point that is overlapped with the coating initial point, and the surrounding light-reflecting frame has a convex portion disposed on the coating terminal point.

More particularly, the light-emitting elements are divided into a plurality of light-emitting groups, and each light-emitting group is composed of at least one of the light-emitting elements. The light-emitting groups are in series connection with each other and disposed on the circuit substrate, the assembled type capacitors are in series connection with each other and disposed on the cover body, and the light-emitting groups are respectively in parallel connection with the assembled type capacitors.

More particularly, the light-emitting structure includes a plurality of resistors disposed on the circuit substrate and electrically connected to the circuit substrate, the resistors are in series connection with each other and disposed on the circuit substrate, the resistors are respectively in parallel connection with the light-emitting groups, and the resistors are respectively in parallel connection with the assembled type capacitors.

More particularly, the light-emitting elements are divided into a plurality of light-emitting groups, and each light-emitting group is composed of at least one of the light-emitting elements. The light-emitting groups are in parallel connection with each other and disposed on the circuit substrate, the assembled type capacitors are in parallel connection with each other and disposed on the cover body, and the light-emitting groups are respectively in parallel connection with the assembled type capacitors.

More particularly, the light-emitting structure includes a plurality of resistors disposed on the circuit substrate and electrically connected to the circuit substrate, the resistors are in parallel connection with each other and disposed on the circuit substrate, the resistors are respectively in parallel connection with the light-emitting groups, and the resistors are respectively in parallel connection with the assembled type capacitors.

Therefore, the power factor provided by the light-emitting elements of the light-emitting module can be maintained or adjusted due to the design of "the assembled type capacitor assembly including at least one assembled type capacitor electrically connected the circuit substrate through an assembled type electrical connection assembly, and the at least one assembled type capacitor being separated from the circuit substrate" or "the assembled type capacitor assembly including a plurality of assembled type capacitors respectively disposed inside the first receiving spaces of the cover body, each assembled type capacitor being separated from the circuit substrate, and each assembled type capacitor being electrically connected to the circuit substrate and the light-emitting elements of the light-emitting structure through the at least one positive electrical connection and the at least one negative electrical connection".

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DETAILED DESCRIPTION OF THE PREFERRED EMBODIMENTS

The embodiments of "an illumination device and a light-emitting module thereof" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Referring to FIG. 1 to FIG. 6, the instant disclosure provides a light-emitting module M, comprising a cover structure 1, a light-emitting structure 2, an assembled type capacitor assembly 3 and an assembled type electrical connection assembly 4.

Figure 1:
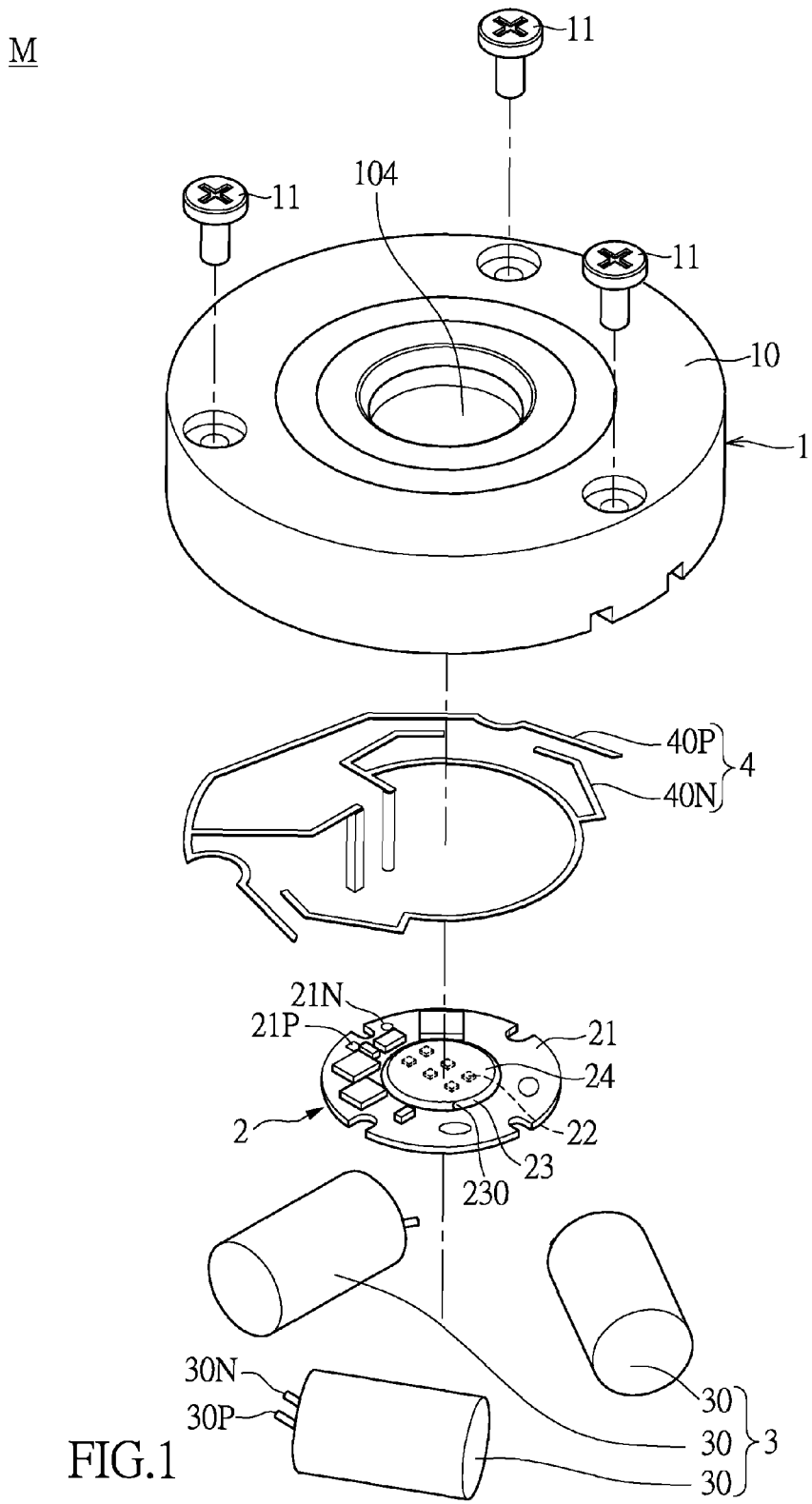
FIG. 1 shows a perspective, exploded, schematic view of the light-emitting module according to the instant disclosure.
Figure 2:
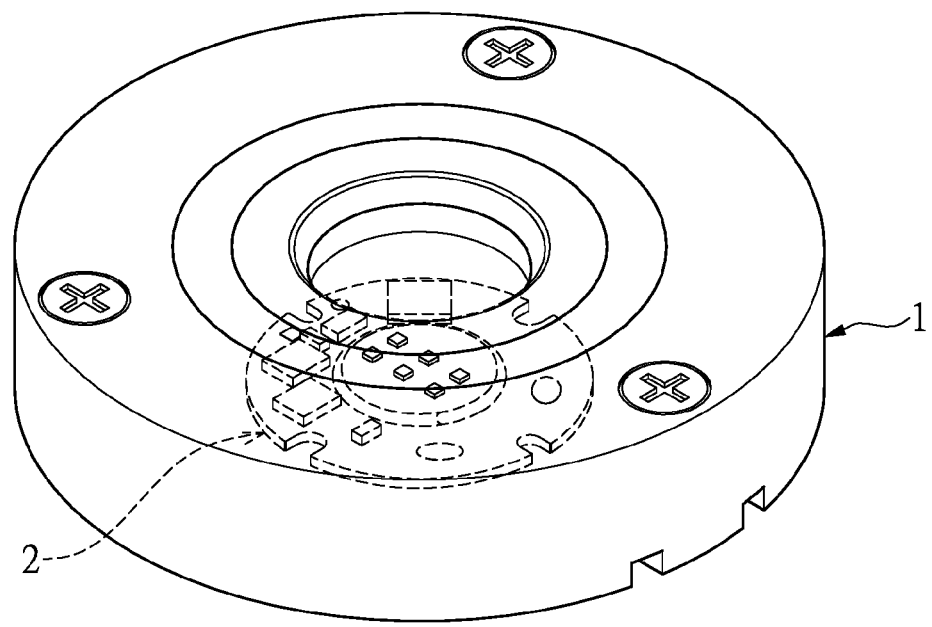
FIG. 2 shows a perspective, assembled, schematic view of the light-emitting module according to the instant disclosure.
Figure 3:
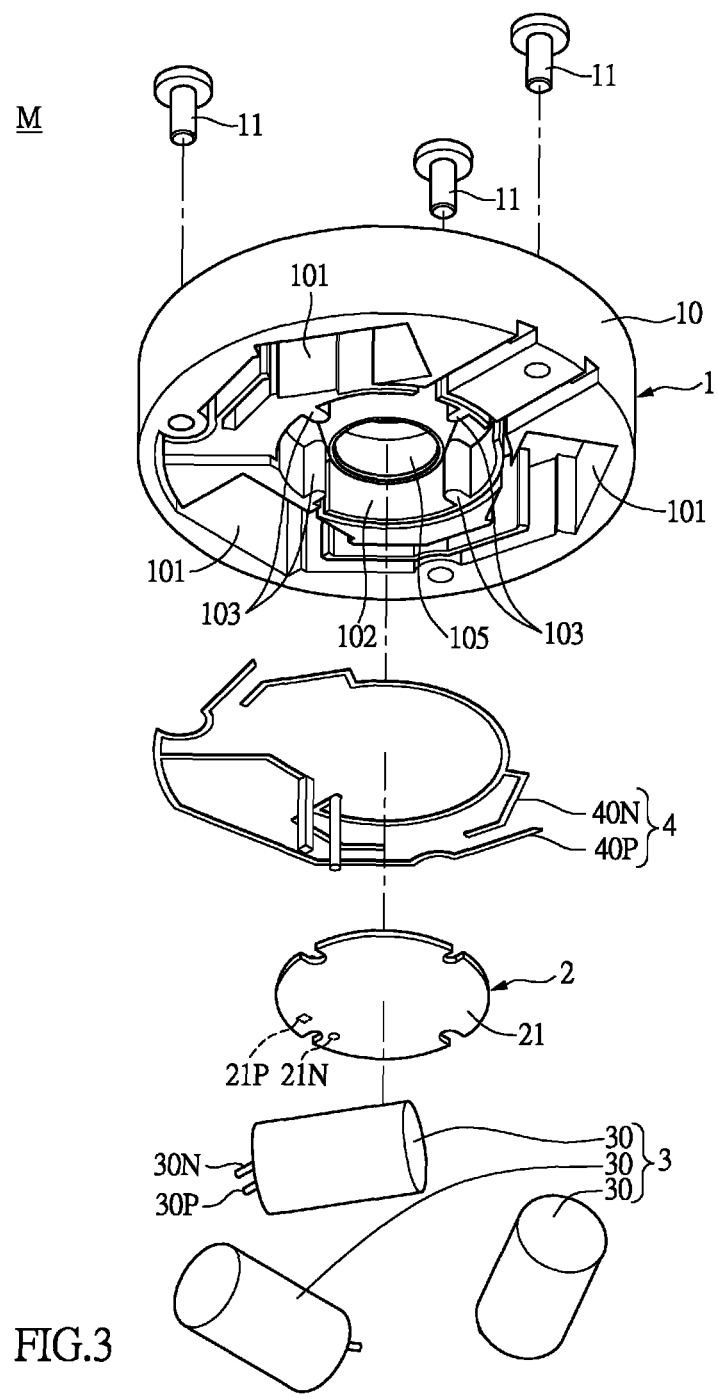
FIG. 3 shows another perspective, exploded, schematic view of the light-emitting module according to the instant disclosure.
Figure 5:
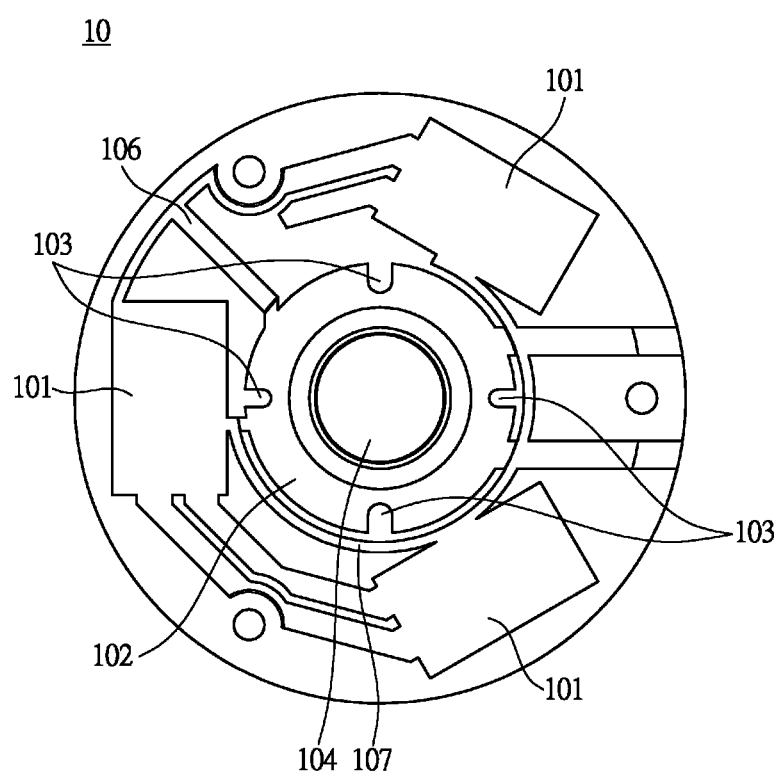
FIG. 5 shows a top, schematic view of the cover body of the light-emitting module according to the instant disclosure.

First, referring to FIG. 1, FIG. 3 and FIG. 5, the cover structure 1 include a cover body 10 and a plurality of positioning elements 11 (such as screws) for positioning the cover body 10. The cover body 10 has a plurality of first receiving spaces 101 formed on a bottom side thereof, at least one second receiving space 102 formed on the bottom side thereof, and a plurality of positioning portions 103 disposed inside the at least one second receiving space 102, and the cover body 10 has a through opening 104 and a surrounding light-reflecting surface 105 formed on an inner wall of the through opening 104. For example, the cover body 10 has at least one first connection passage 106 and at least one second passage 107, the at least one first connection passage 106 is communicated between the first receiving spaces 101 and the at least one second receiving space 102, and the at least one second connection passage 107 is communicated between the first receiving spaces 101 and the at least one second receiving space 102.

Figure 4:
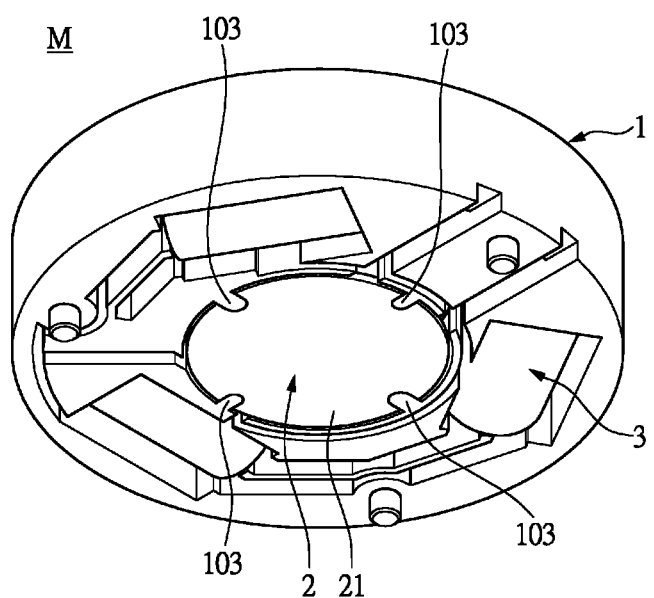
FIG. 4 shows another perspective, assembled, schematic view of the light-emitting module according to the instant disclosure.

Moreover, referring to FIG. 1, FIG. 3 and FIG. 4, the light-emitting structure 2 is disposed inside the at least one second receiving space 102. The light-emitting structure 2 includes a circuit substrate 21 positioned on the bottom side of the cover body 10 through the positioning portions 103, a plurality of light-emitting elements 22 disposed on the circuit substrate 21 and electrically connected to the circuit substrate 21, a surrounding light-reflecting frame 23 (such as a surrounding gel body) disposed on the circuit substrate 21 to surround the light-emitting elements 22, and a package body 24 (such as gel body made of epoxy or silicone) disposed on the circuit substrate 21 to cover the light-emitting elements 22, and the light-emitting elements 22, the surrounding light-reflecting frame 23 and the package body 24 are exposed from the through opening 104. For example, the circuit substrate 21 has at least one positive conductive pad 21P and at least one negative conductive pad 21N, and each light-emitting element 22 may be a LED chip. In addition, the surrounding light-reflecting frame 23 is extended by coating from a coating initial point P1 to a coating terminal point P2 that is overlapped with the coating initial point P1, and the surrounding light-reflecting frame 23 has a convex portion 230 disposed on the coating terminal point P2.

Figure 6:
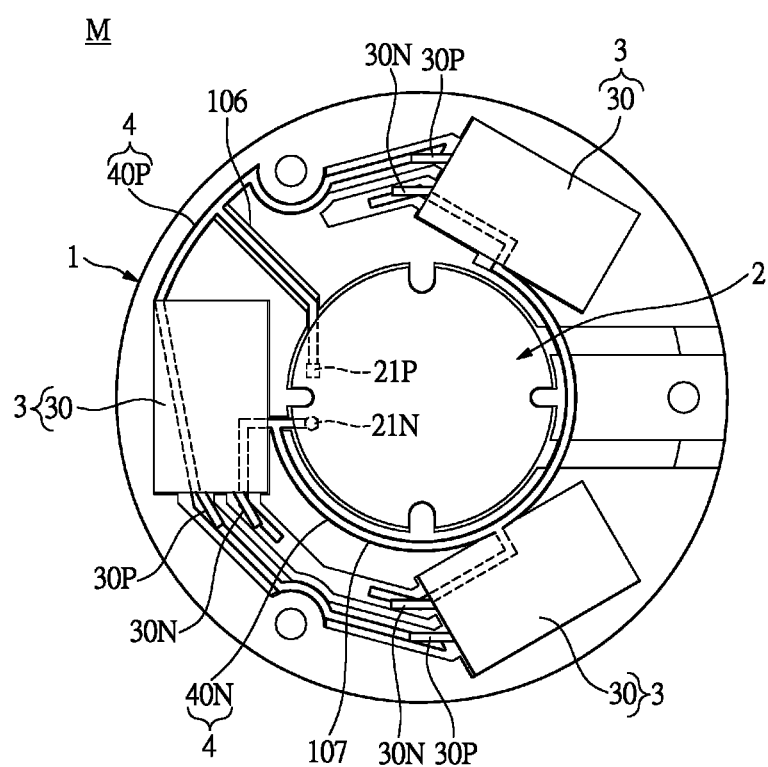
FIG. 6 shows a top, schematic view of the light-emitting module according to the instant disclosure.

Furthermore, referring to FIG. 3, FIG. 4 and FIG. 6, the assembled type capacitor assembly 3 includes a plurality of assembled type capacitors 30 respectively disposed inside the first receiving spaces 101 of the cover body 10, and each assembled type capacitor 30 is separated from the circuit substrate 21 by a predetermined distance, that is to say, the assembled type capacitor 30 cannot contact the circuit substrate 21. For example, each assembled type capacitor 30 has a positive electrode 30P and a negative electrode 30N.

In addition, referring to FIG. 3, FIG. 5 and FIG. 6, the assembled type electrical connection assembly 4 is disposed between the light-emitting structure 2 and the assembled type capacitor assembly 3. The assembled type electrical connection assembly 4 includes at least one positive electrical connection 40P and at least one negative electrical connection 40N, and each assembled type capacitor 30 is electrically connected to the circuit substrate 21 and the light-emitting elements 22 of the light-emitting structure 2 through the at least one positive electrical connection 40P and the at least one negative electrical connection 40N. For example, the at least one positive electrical connection 40P is received inside the at least one first connection passage 106, and the at least one negative electrical connection 40N is received inside the at least one second passage 107. Furthermore, the positive electrode 30P of each assembled type capacitor 30 is electrically connected to the at least one positive conductive pad 21P of the circuit substrate 21 through at least one positive electrical connection 40P, and the negative electrode 30N of each assembled type capacitor 30 is electrically connected to the at least one negative conductive pad 21N of the circuit substrate 21 through at least one negative electrical connection 40N.

Figure 7:
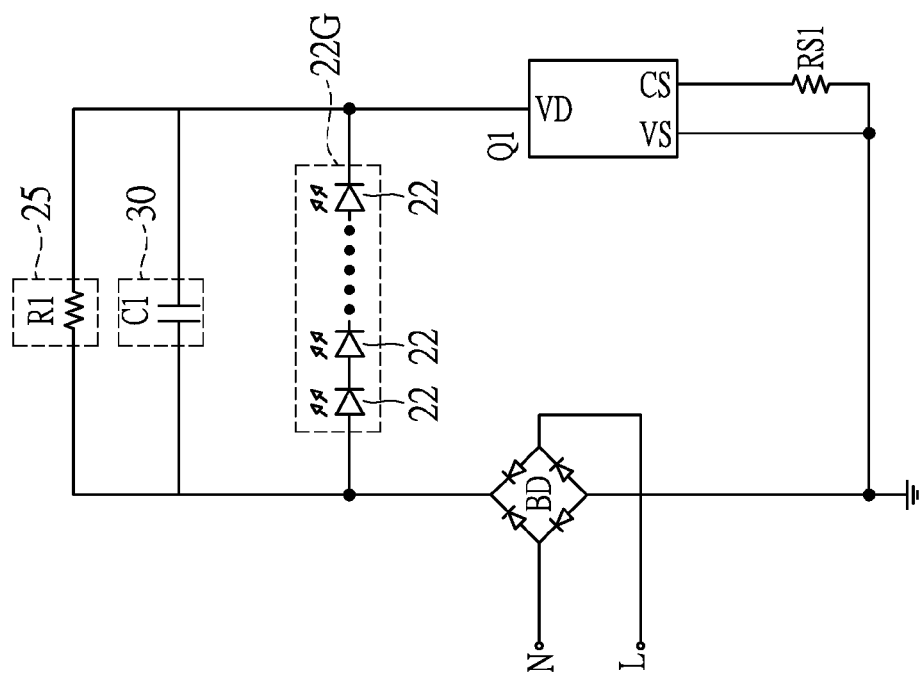
FIG. 7 shows a circuit diagram of the light-emitting module according to the instant disclosure.
Figure 10:
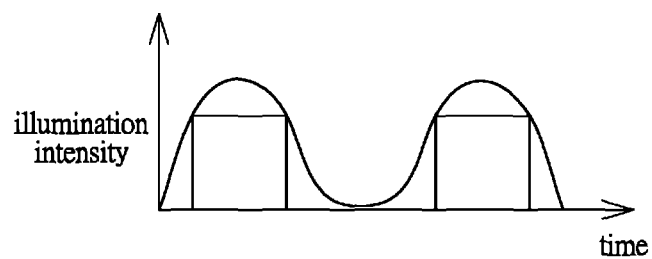
FIG. 10 shows an oscillogram of the relationship between the illumination intensity and time when the light-emitting module using the circuit layout as shown in FIG. 7 according to the instant disclosure.

More particularly, referring to FIG. 7, the light-emitting elements 22 are mated with each other to form a light-emitting group 22G, the light-emitting elements 22 are in series connection with each other and disposed on the circuit substrate 21, and the light-emitting group 22G is in parallel connection with the at least one assembled type capacitor 30. In addition, the light-emitting structure 2 further includes at least one resistor 25 disposed on the circuit substrate 21 and electrically connected to the circuit substrate 21, the at least one resistor 25 is in parallel connection with the light-emitting group 22G and the at least one resistor 25 is in parallel connection with the at least one assembled type capacitor 30. Hence, the power factor provided by the light-emitting elements 22 of the light-emitting module M can be maintained or adjusted and the flicker percentage (or frequency) of the light-emitting elements 22 of the light-emitting module M can be reduced due to the circuit layout as shown in FIG. 7. FIG. 10 shows an oscillogram of the relationship between the illumination intensity and time when the light-emitting module M using the circuit layout as shown in FIG. 7 according to the instant disclosure.

Figure 8:
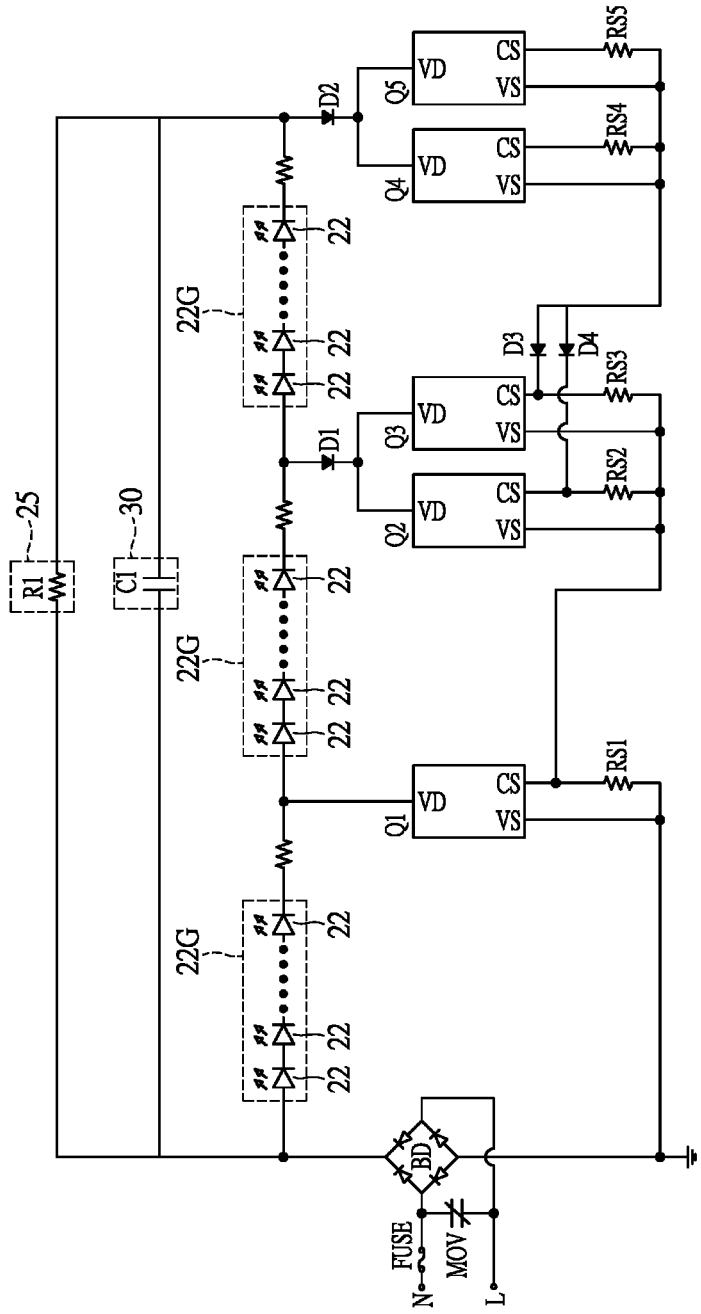
FIG. 8 shows another circuit diagram of the light-emitting module according to the instant disclosure.
Figure 11:
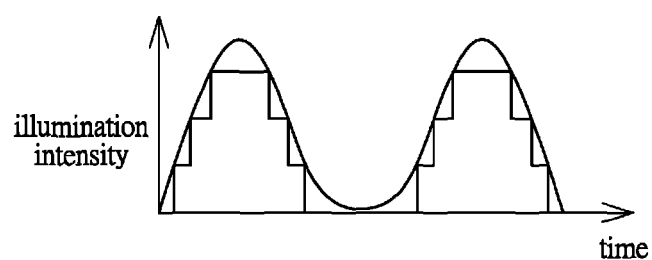
FIG. 11 shows an oscillogram of the relationship between the illumination intensity and time when the light-emitting module using the circuit layout as shown in FIG. 8 or FIG. 9 according to the instant disclosure.

More particularly, the light-emitting elements 22 can be divided into a plurality of light-emitting groups 22G and each light-emitting group 22G is composed of at least one of the light-emitting elements 22 or more light-emitting elements 22. The light-emitting groups 22G are in series connection with each other and disposed on the circuit substrate 21, the assembled type capacitors 30 are in series connection with each other and disposed on the cover body 10, and the light-emitting groups 22G are respectively in parallel connection with the assembled type capacitors 30. In addition, the light-emitting structure 2 further includes a plurality of resistors 25 disposed on the circuit substrate 21 and electrically connected to the circuit substrate 21, the resistors 25 are in series connection with each other and disposed on the circuit substrate 21, the resistors 25 are respectively in parallel connection with the light-emitting groups 22G and the resistors 25 are respectively in parallel connection with the assembled type capacitors 30. For example, referring to FIG. 8, each light-emitting group 22G is composed of a plurality of light-emitting elements 22, the light-emitting groups 22G are in parallel connection with an assembled type capacitor 30, a resistor 25 is in parallel connection with the light-emitting groups 22G, and a resistor 25 is in parallel connection with an assembled type capacitor 30. Hence, the power factor provided by the light-emitting elements 22 of the light-emitting module M can be maintained or adjusted and the flicker percentage (or frequency) of the light-emitting elements 22 of the light-emitting module M can be reduced due to the circuit layout as shown in FIG. 8. FIG. 11 shows an oscillogram of the relationship between the illumination intensity and time when the light-emitting module M using the circuit layout as shown in FIG. 8 according to the instant disclosure.

Figure 9:
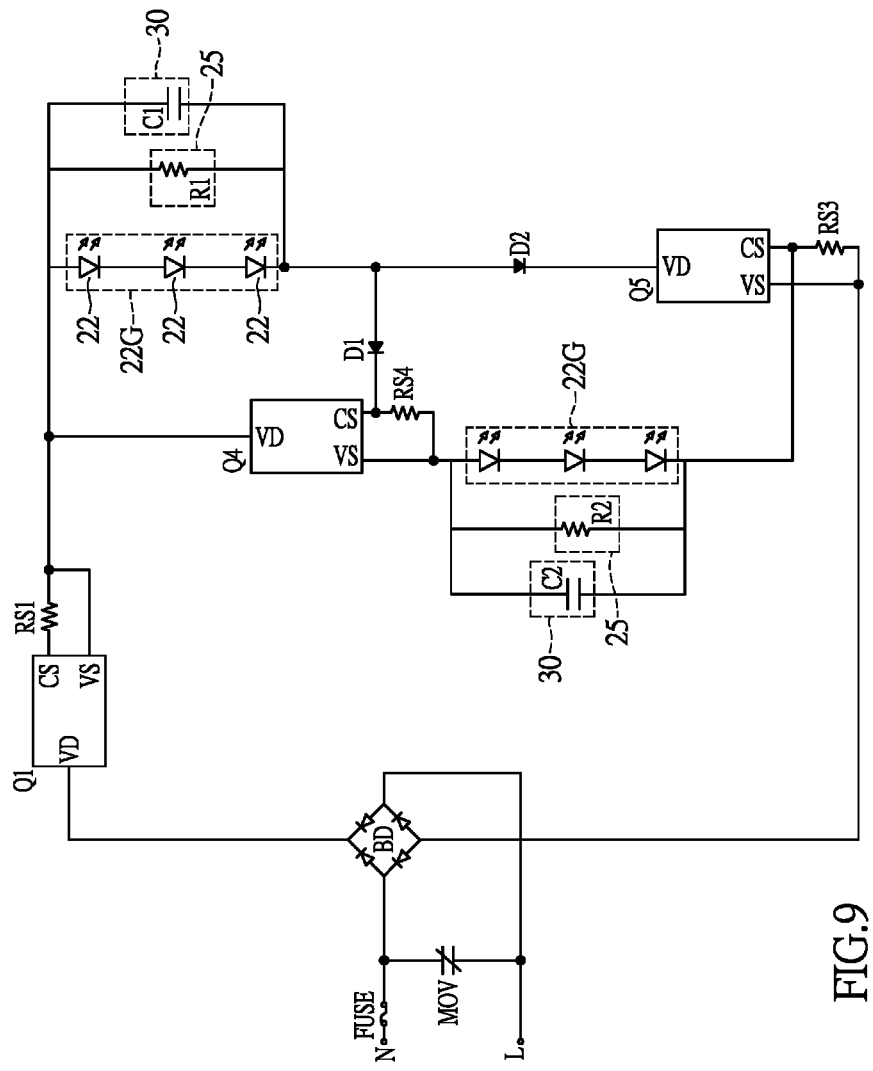
FIG. 9 shows yet another circuit diagram of the light-emitting module according to the instant disclosure.

More particularly, referring to FIG. 9, the light-emitting elements 22 can be divided into a plurality of light-emitting groups 22G and each light-emitting group 22G is composed of at least one of the light-emitting elements 22 or more light-emitting elements 22. The light-emitting groups 22G are in parallel connection with each other and disposed on the circuit substrate 21, the assembled type capacitors 30 are in parallel connection with each other and disposed on the cover body 10, and the light-emitting groups 22G are respectively in parallel connection with the assembled type capacitors 30. In addition, the light-emitting structure 2 further includes a plurality of resistors 25 disposed on the circuit substrate 21 and electrically connected to the circuit substrate 21, the resistors 25 are in parallel connection with each other and disposed on the circuit substrate 21, the resistors 25 are respectively in parallel connection with the light-emitting groups 22G, and the resistors 25 are respectively in parallel connection with the assembled type capacitors 30. Hence, the power factor provided by the light-emitting elements 22 of the light-emitting module M can be maintained or adjusted and the flicker percentage (or frequency) of the light-emitting elements 22 of the light-emitting module M can be reduced due to the circuit layout as shown in FIG. 9. FIG. 11 shows an oscillogram of the relationship between the illumination intensity and time when the light-emitting module M using the circuit layout as shown in FIG. 9 according to the instant disclosure.

Figure 12:
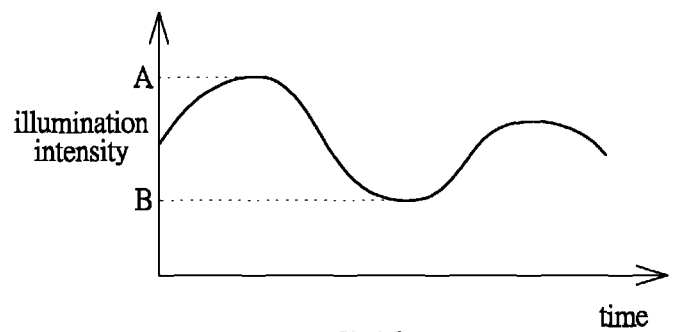
FIG. 12 shows an oscillogram of the relationship between the illumination intensity and time for calculating the flicker percentage of the light-emitting module according to the instant disclosure.

Please note, referring to FIG. 12, the flicker percentage of the light-emitting module M can be obtained by the following formula: $(A-B)/(A+B) \times 100\%$, in which A is maximum illumination intensity, B is minimum illumination intensity, but the formula is merely an example and is not meant to limit the instant disclosure.

Please note, as shown in FIG. 7, FIG. 8 or FIG. 9, the reason that the light-emitting module M of the instant disclosure uses at least one resistor 25 is: when the light-emitting module M is turn off, light generated by the light-emitting elements 22 can be quickly turned off due to the at least one resistor 25 in parallel connection with the light-emitting elements 22 (that is to say the illumination intensity can be quickly reduced to zero due to the usage of the at least one resistor 25).

In conclusion, the instant disclosure provides a light-emitting module M, comprising a cover structure 1, a light-emitting structure 2 and an assembled type capacitor assembly 3. The cover structure 1 has a through opening 104. The light-emitting structure 2 includes a circuit substrate 21 disposed under the cover structure 1 and a plurality of light-emitting elements 22 disposed on the circuit substrate 21 and exposed from the through opening 104. The assembled type capacitor assembly 3 includes at least one assembled type capacitor 30 electrically connected the circuit substrate 21 through an assembled type electrical connection assembly 4, and the at least one assembled type capacitor 30 is separated from the circuit substrate 21 by a predetermined distance, that is to say, the assembled type capacitor 30 cannot contact the circuit substrate 21. More particularly, the at least one assembled type capacitor 30 is disposed inside the cover structure 1, the light-emitting elements 22 are in series connection with each other and disposed on the circuit substrate 21, each the light-emitting element 22 is in parallel connection with the at least one assembled type capacitor 30, and the light-emitting structure 2 includes at least one resistor 25 disposed on the circuit substrate 21 and in parallel connection with the at least one assembled type capacitor 25.

Figure 13:
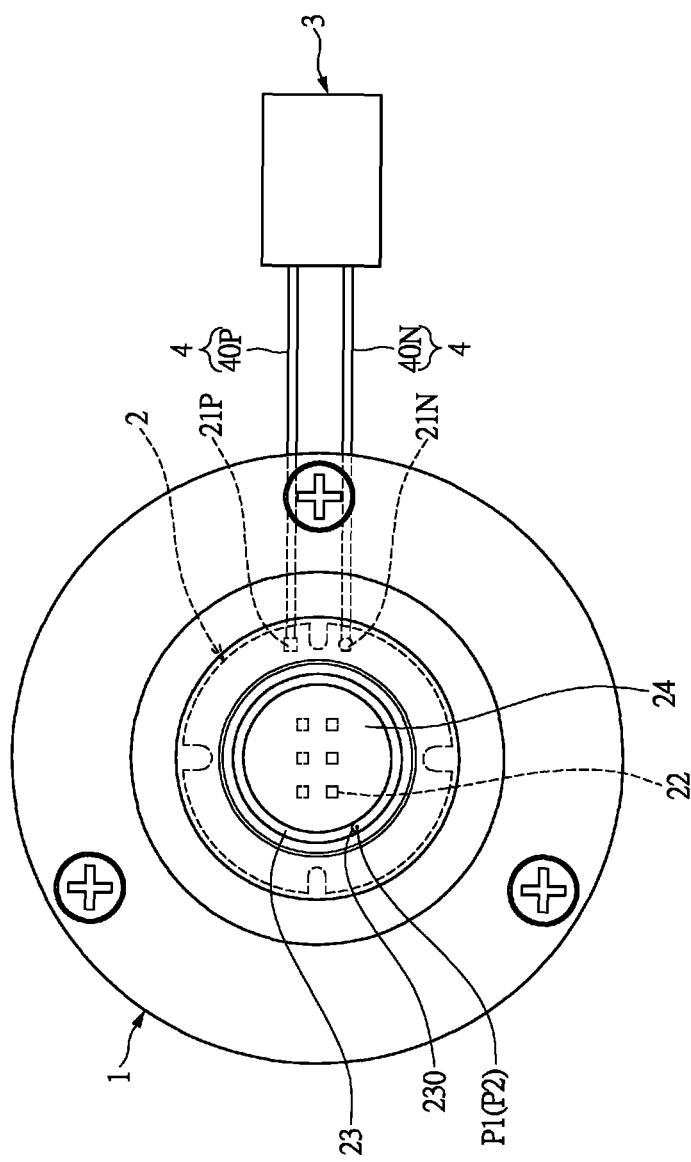
FIG. 13 shows a top, schematic view of the assembled type capacitor of the light-emitting module disposed out of the cover structure according to the instant disclosure.

Please note, referring to FIG. 13, the at least one assembled type capacitor 30 can be disposed outside the cover structure 1, and the at least one assembled type capacitor 30 can be electrically connected to the circuit substrate 21 by the at least one positive electrical connection 40P and the at least one negative electrical connection 40N that are extended out of the cover structure 1. Therefore, the whole size of cover structure 1 without receiving the at least one assembled type capacitor 30 can be reduced.

Figure 14:
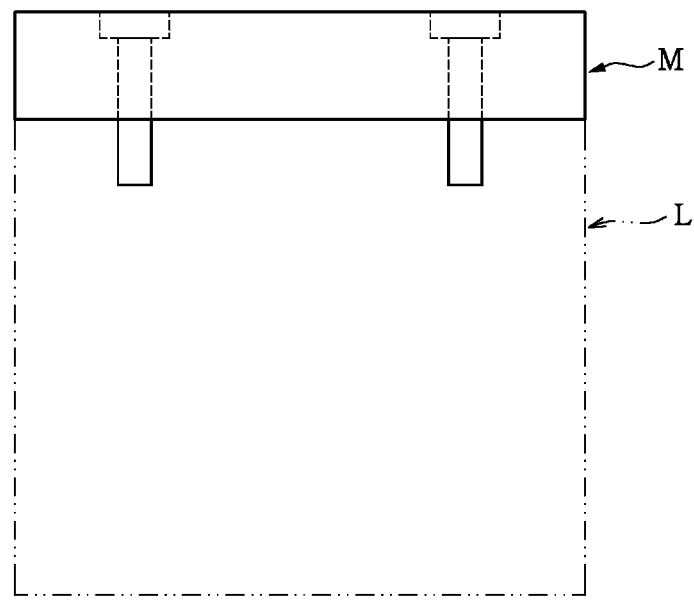
FIG. 14 shows a lateral, schematic view of the illumination device according to the instant disclosure.

More particularly, referring to FIG. 14, the instant disclosure further provides an illumination device Z, comprising a lamp structure L and a light-emitting module M, and the light-emitting module M is disposed on the lamp structure L. In addition, the light-emitting module M includes a cover structure 1, a light-emitting structure 2, an assembled type capacitor assembly 3 and an assembled type electrical connection assembly 4, and the cover body 10 can be positioned on the lamp structure L through the positioning elements 11.

In conclusion, the power factor provided by the light-emitting elements 22 of the light-emitting module M can be maintained or adjusted and the flicker percentage (or frequency) of the light-emitting elements 22 of the light-emitting module M can be reduced due to the design of "the assembled type capacitor assembly 3 including at least one assembled type capacitor 30 electrically connected the circuit substrate 21 through an assembled type electrical connection assembly 4, and the at least one assembled type capacitor 30 being separated from the circuit substrate 21" or "the assembled type capacitor assembly 3 including a plurality of assembled type capacitors 30 respectively disposed inside the first receiving spaces 101 of the cover body 10, each assembled type capacitor 30 being separated from the circuit substrate 21, and each assembled type capacitor 30 being electrically connected to the circuit substrate 21 and the light-emitting elements 22 of the light-emitting structure 2 through the at least one positive electrical connection 40P and the at least one negative electrical connection 40N".

Furthermore, the light-emitting structure 2 further includes at least one resistor 25 disposed on the circuit substrate 21 and electrically connected to the circuit substrate 21. When the light-emitting module M is turn off, light generated by the light-emitting elements 22 can be quickly turned off due to the at least one resistor 25 in parallel connection with the light-emitting elements 22 (that is to say the illumination intensity can be quickly reduced to zero due to the usage of the at least one resistor 25).

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A light-emitting module, comprising:
a cover structure including a cover body and a plurality of positioning elements for positioning the cover body, wherein the cover body has a plurality of first receiving spaces formed on a bottom side thereof, at least one second receiving space formed on the bottom side thereof, and a plurality of positioning portions disposed inside the at least one second receiving space, and the cover body has a through opening and a surrounding light-reflecting surface formed on an inner wall of the through opening;
a light-emitting structure disposed inside the at least one second receiving space, wherein the light-emitting structure includes a circuit substrate positioned on the bottom side of the cover body through the positioning portions, a plurality of light-emitting elements disposed on the circuit substrate and electrically connected to the circuit substrate, a surrounding light-reflecting frame disposed on the circuit substrate to surround the light-emitting elements, and a package body disposed on the circuit substrate to cover the light-emitting elements, and the light-emitting elements, the surrounding light-reflecting frame and the package body are exposed from the through opening;
an assembled type capacitor assembly including a plurality of assembled type capacitors respectively disposed inside the first receiving spaces of the cover body, wherein each assembled type capacitor is separated from the circuit substrate; and
an assembled type electrical connection assembly disposed between the light-emitting structure and the assembled type capacitor assembly, wherein the assembled type electrical connection assembly includes at least one positive electrical connection and at least one negative electrical connection, wherein each assembled type capacitor is electrically connected to the circuit substrate and the light-emitting elements of the light-emitting structure through the at least one positive electrical connection and the at least one negative electrical connection.

2. The light-emitting module of claim 1, wherein the cover body has at least one first connection passage for receiving the at least one positive electrical connection and at least one second passage for receiving the at least one negative electrical connection, the circuit substrate has at least one positive conductive pad and at least one negative conductive pad, and each assembled type capacitor has a positive electrode and a negative electrode, wherein the at least one first connection passage is communicated between the first receiving spaces and the at least one second receiving space, and the positive electrode of each assembled type capacitor is electrically connected to the at least one positive conductive pad of the circuit substrate through at least one positive electrical connection, wherein the at least one second connection passage is communicated between the first receiving spaces and the at least one second receiving space, and the negative electrode of each assembled type capacitor is electrically connected to the at least one negative conductive pad of the circuit substrate through at least one negative electrical connection, wherein the surrounding light-reflecting frame is extended from a coating initial point to a coating terminal point that is overlapped with the coating initial point, and the surrounding light-reflecting frame has a convex portion disposed on the coating terminal point.

3. The light-emitting module of claim 1, wherein the light-emitting elements are divided into a plurality of light-emitting groups, and each light-emitting group is composed of at least one of the light-emitting elements, wherein the light-emitting groups are in series connection with each other and disposed on the circuit substrate, the assembled type capacitors are in series connection with each other and disposed on the cover body, and the light-emitting groups are respectively in parallel connection with the assembled type capacitors.

4. The light-emitting module of claim 3, wherein the light-emitting structure includes a plurality of resistors disposed on the circuit substrate and electrically connected to the circuit substrate, the resistors are in series connection with each other and disposed on the circuit substrate, the resistors are respectively in parallel connection with the light-emitting groups, and the resistors are respectively in parallel connection with the assembled type capacitors.

5. The light-emitting module of claim 1, wherein the light-emitting elements are divided into a plurality of light-emitting groups, and each light-emitting group is composed of at least one of the light-emitting elements, wherein the light-emitting groups are in parallel connection with each other and disposed on the circuit substrate, the assembled type capacitors are in parallel connection with each other and disposed on the cover body, and the light-emitting groups are respectively in parallel connection with the assembled type capacitors.

6. The light-emitting module of claim 3, wherein the light-emitting structure includes a plurality of resistors disposed on the circuit substrate and electrically connected to the circuit substrate, the resistors are in parallel connection with each other and disposed on the circuit substrate, the resistors are respectively in parallel connection with the light-emitting groups, and the resistors are respectively in parallel connection with the assembled type capacitors.

7. An illumination device, comprising:
a lamp structure; and
a light-emitting module disposed on the lamp structure, wherein the light-emitting module includes:
a cover structure including a cover body and a plurality of positioning elements for positioning the cover body on the lamp structure, wherein the cover body has a plurality of first receiving spaces formed on a bottom side thereof, at least one second receiving space formed on the bottom side thereof, and a plurality of positioning portions disposed inside the at least one second receiving space, and the cover body has a through opening and a surrounding light-reflecting surface formed on an inner wall of the through opening;
a light-emitting structure disposed inside the at least one second receiving space, wherein the light-emitting structure includes a circuit substrate positioned on the bottom side of the cover body through the positioning portions, a plurality of light-emitting elements disposed on the circuit substrate and electrically connected to the circuit substrate, a surrounding light-reflecting frame disposed on the circuit substrate to surround the light-emitting elements, and a package body disposed on the circuit substrate to cover the light-emitting elements, and the light-emitting elements, the surrounding light-reflecting frame and the package body are exposed from the through opening;

an assembled type capacitor assembly including a plurality of assembled type capacitors respectively disposed inside the first receiving spaces of the cover body, wherein each assembled type capacitor is separated from the circuit substrate; and an assembled type electrical connection assembly disposed between the light-emitting structure and the assembled type capacitor assembly, wherein the assembled type electrical connection assembly includes at least one positive electrical connection and at least one negative electrical connection, wherein each assembled type capacitor is electrically connected to the circuit substrate and the light-emitting elements of the light-emitting structure through the at least one positive electrical connection and the at least one negative electrical connection.

8. The illumination device of claim 7, wherein the cover body has at least one first connection passage for receiving the at least one positive electrical connection and at least one second passage for receiving the at least one negative electrical connection, the circuit substrate has at least one positive conductive pad and at least one negative conductive pad, and each assembled type capacitor has a positive electrode and a negative electrode, wherein the at least one first connection passage is communicated between the first receiving spaces and the at least one second receiving space, and the positive electrode of each assembled type capacitor is electrically connected to the at least one positive conductive pad of the circuit substrate through at least one positive electrical connection, wherein the at least one second connection passage is communicated between the first receiving spaces and the at least one second receiving space, and the negative electrode of each assembled type capacitor is electrically connected to the at least one negative conductive pad of the circuit substrate through at least one negative electrical connection, wherein the surrounding light-reflecting frame is extended from a coating initial point to a coating terminal point that is overlapped with the coating initial point, and the surrounding light-reflecting frame has a convex portion disposed on the coating terminal point.

9. The illumination device of claim 7, wherein the light-emitting elements are divided into a plurality of light-emitting groups, and each light-emitting group is composed of at least one of the light-emitting elements, wherein the light-emitting groups are in series connection with each other and disposed on the circuit substrate, the assembled type capacitors are in series connection with each other and disposed on the cover body, and the light-emitting groups are respectively in parallel connection with the assembled type capacitors.

10. The illumination device of claim 9, wherein the light-emitting structure includes a plurality of resistors disposed on the circuit substrate and electrically connected to the circuit substrate, the resistors are in series connection with each other and disposed on the circuit substrate, the resistors are respectively in parallel connection with the light-emitting groups, and the resistors are respectively in parallel connection with the assembled type capacitors.

11. The illumination device of claim 7, wherein the light-emitting elements are divided into a plurality of light-emitting groups, and each light-emitting group is composed of at least one of the light-emitting elements, wherein the light-emitting groups are in parallel connection with each other and disposed on the circuit substrate, the assembled type capacitors are in parallel connection with each other and disposed on the cover body, and the light-emitting groups are respectively in parallel connection with the assembled type capacitors.

12. The illumination device of claim 11, wherein the light-emitting structure includes a plurality of resistors disposed on the circuit substrate and electrically connected to the circuit substrate, the resistors are in parallel connection with each other and disposed on the circuit substrate, the resistors are respectively in parallel connection with the light-emitting groups, and the resistors are respectively in parallel connection with the assembled type capacitors.

* * * * *